United States Patent [19]

Miles et al.

[11] 4,059,663
[45] Nov. 22, 1977

[54] PRODUCTION OF BETA-ALUMINA CERAMIC ARTICLES AND FURNACE THEREFOR

[75] Inventors: Lyndon James Miles; Ivor Wynn Jones, both of Chester, England

[73] Assignee: The Electricity Council, London, England

[21] Appl. No.: 638,868

[22] Filed: Dec. 8, 1975

Related U.S. Application Data

[63] Continuation of Ser. No. 450,111, March 11, 1974, abandoned.

[30] Foreign Application Priority Data

Mar. 12, 1973 United Kingdom ............... 11835/73

[51] Int. Cl.² .............................................. C04B 33/32
[52] U.S. Cl. ........................................ 264/65; 264/61; 264/104; 429/191; 429/193
[58] Field of Search ...................... 264/61, 65, 64, 66, 264/104; 106/63, 65; 219/10.69, 10.71, 10.55 A; 429/191, 193

[56] References Cited

U.S. PATENT DOCUMENTS

| | | | |
|---|---|---|---|
| 3,903,225 | 9/1975 | Jones et al. | 264/66 |
| 3,950,463 | 4/1976 | Jones et al. | 264/66 |

Primary Examiner—Robert F. White
Assistant Examiner—John A. Parrish
Attorney, Agent, or Firm—Beveridge, DeGrandi, Kline & Lunsford

[57] ABSTRACT

In making beta-alumina ceramic articles by a fast firing technique in which the green shapes of compressed powder material are sintered by passing them continuously through a tubular furnace, the furnace is sloped upwardly to give convective gas flow forwardly through the furnace at a speed not less than the speed of movement of the article or other means are provided for causing such a gas flow. An induction furnace is described having a rotating tube and automatic temperature control means.

9 Claims, 3 Drawing Figures

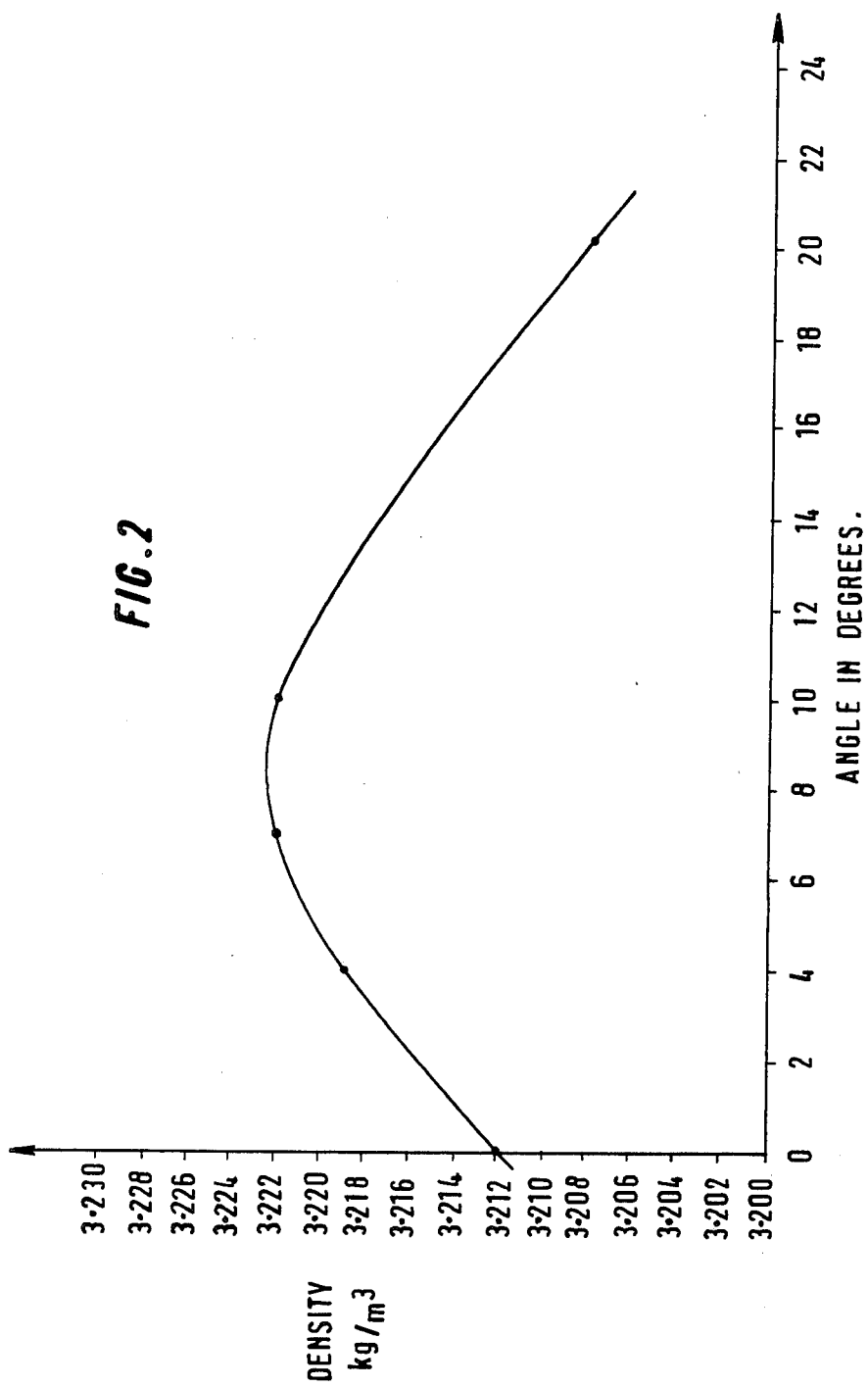

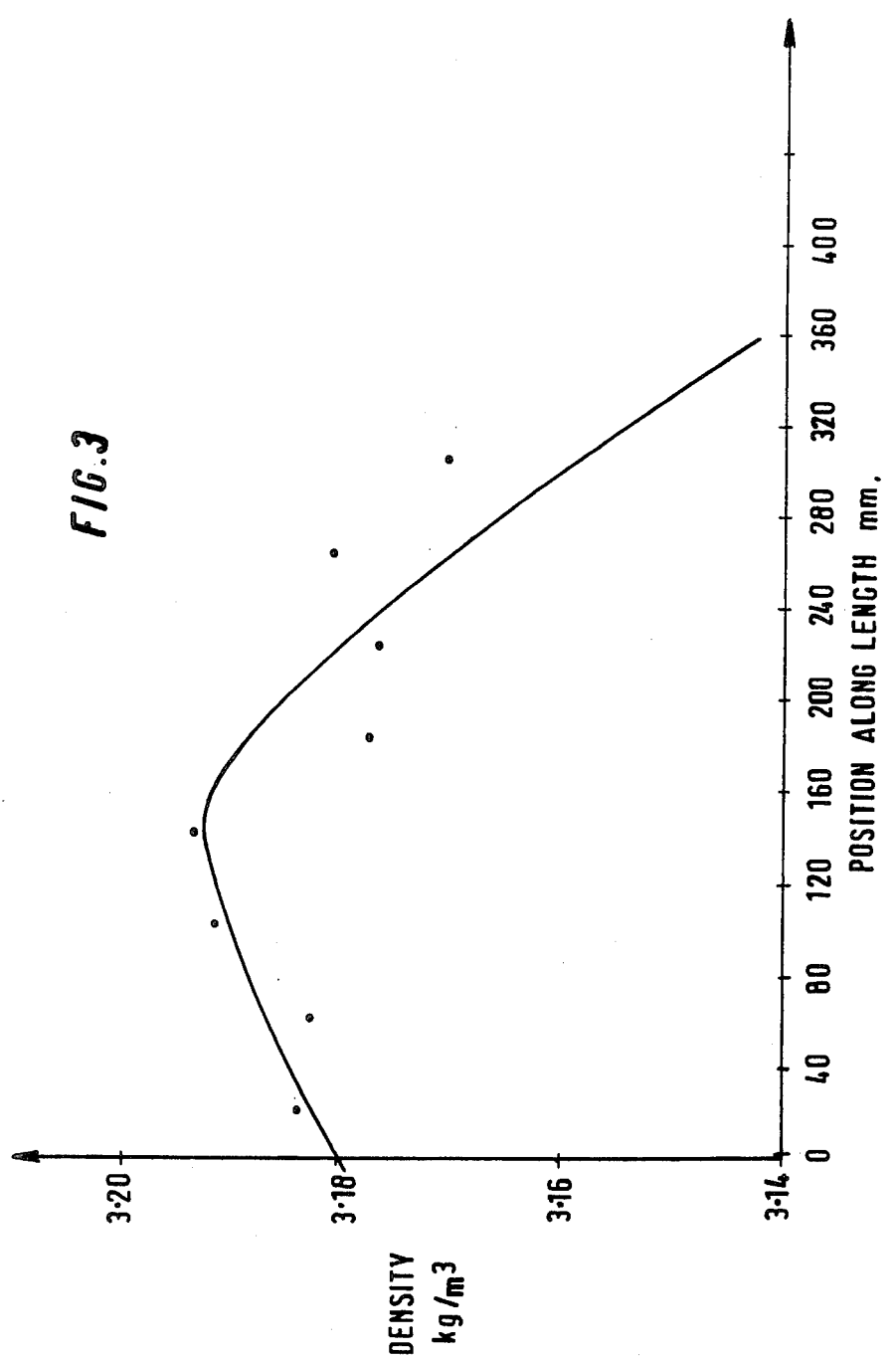

PRODUCTION OF BETA-ALUMINA CERAMIC ARTICLES AND FURNACE THEREFOR

This is a continuation of application Ser. No. 450,111 filed Mar. 11, 1974, now abandoned.

BACKGROUND OF THE INVENTION

1. Field of the Invention

This invention relates to the continuous production of β-alumina ceramic articles by a sintering process in which compressed powder material is traversed through a furnace.

β-Alumina ceramic is a material having a nominal composition by weight of 5% $Na_2O$, 95% $Al_2O_3$. The amount of sodium oxide in practice can range from 5 up to 10%. It may also contain oxides of magnesium and/or lithium. The material can be sintered in the temperature range 1550° to 1900° C. It is used in sodium sulphur cells and other electrochemical devices requiring passage of sodium ions. Desirable properties for this material in such applications include high density, imperviousness to helium gas and close control of composition and properties throughout the bulk and particularly right up to the surface of the material. The material may typically be required in the form of long thin wall tubes with or without a closed end or in the form of discs.

2. Prior Art

As is described in British patent specification No. 1297373, articles of β-alumina ceramic may be produced using a fast firing technique by forming shapes of compressed powder of the required composition and moving these shapes through a tubular furnace so that a short length of the material is raised to the sintering temperature, the movement being continuous so that the heated zone is gradually moved along the length of the material to be fired.

At the firing temperature, the volatile component ($Na_2O$) vaporises, leading to variability of composition and ceramic properties in the article. In conventional firing, loss of soda may be prevented by buffering, i.e. by surrounding the electrolyte with a loose powder of the same composition. However due to temperature gradients within the furnace causing variations in the vapour pressure of the soda, the fired ceramic may still have properties which vary between different parts of the article.

SUMMARY OF THE INVENTION

It is an object of the present invention to provide an improved method of continuously producing articles of β-alumina ceramic material which overcomes these difficulties.

According to one aspect of the present invention, a method of producing a β-alumina ceramic article or articles comprises the steps of forming a shape or shapes of compressed powder of the required composition and then moving the shape or a set of these shapes continuously through a tubular furnace and simultaneously causing a gas flow through the tubular furnace in the direction of movement of the material at a speed equal to or greater than the speed of movement of the material. In practice the speed of movement of the material is very slow (for example 50 mm per minute) so that any induced or forced gas flow in practice will be faster than this and, in the following description, unless specifically stated otherwise, it is to be understood that any reference to the flow of gas through the furnace means a flow faster than the speed of the material.

Preferably, the movement of the shape or set of shapes through the furnace is such that a short length of material is raised to the sintering temperature with the heated zone gradually moving along the length of material to be fired.

With the method described above, a very short heating and sintering time can be employed as described in the aforementioned specification No. 1297373. By choice of the length of furnace, rate of traverse and firing temperature, close control of grain size can be obtained as described in that specification. With the method of the present invention, as the unfired material is heated on entering the furnace it gives off water vapour and a small amount of sodium oxide vapour. The water vapour is carried forward through the furnace by the prescribed flow. The water vapour cannot recondense on the articles entering the firing zone and thereby accumulate in the furnace to reach critical concentration on the unfired material. By the evaporation of the small amount of sodium oxide from the incoming articles, a stable sodium oxide-rich atmosphere is produced and maintained in the firing zone. This is in contrast to the conditions which would occur, for example, if the gas flow was in the opposite direction to the movement of the article. In that case, the water vapour would recondense on the cold incoming material. The water concentration would tend to build up towards a critical value and cause the incoming tubes to break up in the furnace. The conditions in the sintering zone are non-equilibrium and the properties of the ceramic material will deteriorate as the article or run of successive articles proceeds through the furnace.

With the method of the present invention, the flow must be sufficient to carry the water vapour through the furnace but not so great that the sodium oxide is carried away from the firing zone faster than it can be replaced.

The gas flow, which would usually be air together with the aforementioned water and sodium oxide vapour, may be a forced flow but most conveniently it is a convective flow, the furnace being sloped upwardly in the direction of movement of the article to induce the convective flow. The rate of flow will depend not only on the slope of the tube but also on the temperature, the size of the articles in the furnace and the dimensions of the furnace components. In practice however it is readily possible to determine empirically the optimum slope of a furnace for articles of a given size and for given firing conditions. The slope typically is of the order of a few degrees.

The invention further includes within its scope a furnace for the production of β-alumina ceramic articles comprising an open ended tube with heating means, e.g. an induction coil around the tube, and means for moving the articles continuously through the tube at a uniform rate and either having means for forcing air to flow through the tube or having the tube sloping upwardly with respect to the horizontal in the direction of movement of the articles. As is described in the aforementioned specification, preferably an induction coil is used and a susceptor block, for example a block of graphite, is arranged around said tube within the induction coil.

For controlling the temperature in the furnace, conveniently there is provided a second tube through said susceptor block with open ends, a radiation pyrometer being arranged for observing a test element within said second tube. This test element may be of any suitable material (e.g. recrystallised alumina) such that temperature variations may be observed by the pyrometer. The temperature of the test element need not be necessarily the same as the β-alumina ceramic article being sintered although preferably the furnace is arranged so that test element conditions are, as closely as possible, similar to those for the article being fired. However, variations of temperature of the test article will correspond to variations of temperature of the β-alumina ceramic material and hence the output of the pyrometer may be used for controlling the temperature of the furnace. Preferably an automatic control system is provided for this control of temperature.

In one convenient arrangement, the furnace tube through which the β-alumina ceramic articles are traversed and the tube containing the test article are symmetrically disposed on opposite sides of the axis of the induction heating coil. In such an arrangement preferably the tube containing the β-alumina ceramic, referred to hereinafter as the firing tube, is continuously rotated to ensure uniform temperature condition and, for this purpose is arranged within a second stationary tube of slightly greater diameter extending through the susceptor block and furnace. With such a construction it has been found possible to control the sintering zone temperature readily to an accuracy of ±5° C. Depending on the requirements, during operation the sintering zone may be maintained at any required temperature between say 1550° and 1900° C., typically at 1700° C; each portion of the material to be fired may typically remain in the sintering zone for less than 2 minutes. In applying the invention to making articles using a fast-firing technique, as described in the aforementioned British patent, the compressed powdered shapes may be traversed at a uniform speed v through the furnace and the furnace may have a temperature profile increasing in temperature between 1600° C and 1900° C and decreasing towards the other end, the length 1 of the sintering zone which is within 10° C of the maximum temperature in the furnace, and the velocity v at which the tube is traversed being such that the time 1/b during which any point in the material is in the sintering zone is between 12 seconds and 2 minutes, the temperature profile of the furnace and the rate of traverse of the material being such that any point on the material is heated up to the sintering temperature and cooled from the sintering temperature at a rate between 200° C per minute and 2400° C per minute.

BRIEF DESCRIPTION OF THE DRAWINGS

FIGS. 2 and 3 are graphical diagrams illustrating the relation between density of material and angle of slope of the furnace for one set of experiments and showing the improved results obtained when using an uphill slope (as in FIG. 2) compared with a downhill slope (as in FIG. 3).

DESCRIPTION OF THE PREFERRED EMBODIMENTS

Figure 1:
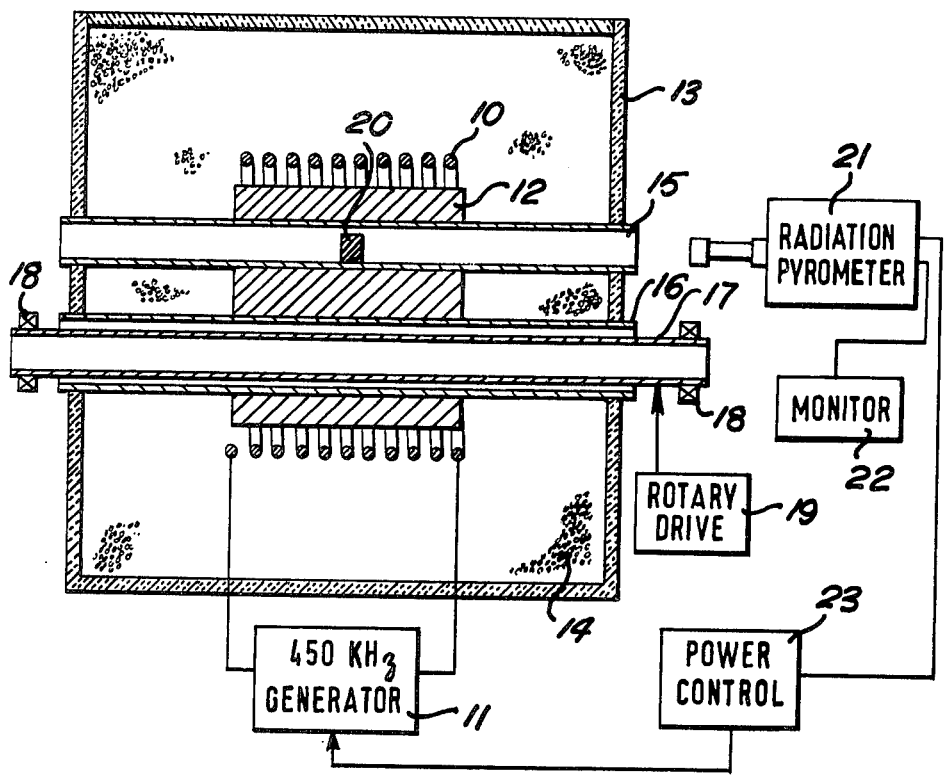
FIG. 1 is a diagrammatic section through one embodiment of an induction furnace for sintering β-alumina ceramic.

Referring to FIG. 1, there is shown a furnace for the sintering of β-alumina ceramic comprising an induction coil 10 energised from an alternating current generator 11 typically operating at 450 kHz. The coil 10 is a helical coil, typically only a few inches long and surrounding a graphite susceptor block 12. The coil 10 and susceptor block 12 are contained within an asbestos box forming a housing 13 which box is filled with bubbled alumina insulation, indicated diagrammatically at 14. Extending through the block 12 parallel to the axis of the coil 10 are two bores which are arranged symmetrically with respect to the axis of the coil. The first bore contains a refractory tube 15 which is open-ended and extends through the end walls of the asbestos box 13. The second bore through the susceptor block 12 is of larger diameter than the first bore and contains a fixed open-ended refractory tube 16 within which is a rotatable tube 17 of refractory material, e.g. alumina, for containing the article to be sintered. This tube 17 is carried in bearings 18 and continuously rotated by drive means indicated diagrammatically at 19 to equalise the temperature around the firing zone when the furnace is in operation. Typically rotation rates of 30 to 60 r.p.m. have been employed. The tube 15, when in use, contains a suitable refractory article indicated diagrammatically at 20, typically formed of recrystallised alumina, for observation by a total radiation pyrometer 21 for temperature control purposes. The output from the pyrometer 21 may be fed to a monitor 22 and/or to a power control unit 23 controlling the power output of the generator 11.

To preserve a stable soda-rich atmosphere, the rotating tube 17 should be impervious to the sodium oxide vapour. If the material of the rotating tube reacts with sodium oxide vapour, then the rate of this reaction should be so low that sodium oxide depletion does not occur. It was found, for example, that sodium oxide did react slowly with the recrystallised alumina tube used in the experiments referred to below, converting it into β-alumina. The reaction rate was quite low, the firing tube gaining 20 mg in weight for each 40 g tube which was fired. The loss from the articles being fired was less than 1% of the sodium oxide present. However the conversion of the firing tube to β-alumina is accompanied by a volume change so that this tube no longer remained impervious. For this reason only about 20 meters of tube could be fired before replacing the rotating tube 17; such replacement can be effected however without cooling the furnace.

A continuous air flow through the tube 17 of the furnace is obtained in operation by sloping the furnace upwardly in the direction of movement of the articles. Using convection in this way provides a very simple and reliable means of obtaining the required air flow; obviously however a forced air flow could be obtained in other ways without sloping the furnace.

In the following examples of the manufacture of β-alumina ceramic tubes, the quality of the sintered product is shown quantitatively by the density. The variations in density shown in these examples, although small in absolute terms, are of significance in considering the use of the material as an electrolyte. The examples given are for the purpose of explaining the invention and are therefore directed to showing the effect of changes in the air flow, including in particular the use of an air flow in the direction opposite to that called for by the method of the present invention. In these examples, a furnace as shown in the accompanying drawing was employed. In this furnace the rotating firing tube 17 had a bore of 19 mm, an outside diameter of 25.5 mm and was 500 mm long. The static firing tube 16 was 29 mm bore, 36 mm outside diameter and 375 mm long. The graphite susceptor block 12 was 100 mm long and gave a hot zone length of 120 mm at (T max − 100)° C. All the samples were tubular samples which were pre-dried before firing.

The first of the examples, set out as Example 1 below, relates to a furnace in which the slope was downwards in the direction of movement of the articles. Convection caused the air flow to be in the opposite sense to the direction of movement of the articles. This example is quoted to show the effect of such an arrangement which is contrary to the present invention. The water vapour was carried upwards and recondensed on the incoming material. The water concentration built up to a critical value and caused the incoming tubes to break up in the furnace.

EXAMPLE 1

The articles passed downhill through the furnace in a continuous run at a temperature of 1735° C. and traverse rate of 50 mm per minute. The onset of break-up due to excess water was so rapid that less than 400 mm of ceramic could be produced. The densities of 40 mm pieces, in the order they were fired, are given in the table and are plotted in FIG. 3.

| Position (mm) | Density (Kg/m$^3$) |
|---|---|
| 0 – 40 | 3183 |
| 40 – 80 | 3182 |
| 80 – 120 | 3190 |
| 120 – 160 | 3192 |
| 160 – 200 | 3177 |
| 200 – 240 | 3176 |
| 240 – 280 | 3180 |
| 280 – 320 | 3170 |
| 320 – 370 | 3145 |

In Examples 2, 3 and 4 below, the furnace sloped uphill so that the water vapour and soda vapour were carried through the sintering zone to recondense on the fired tubes. Water vapour could not reach the critical condition on the unfired material and the soda gave a stable sodium oxide atmosphere in the firing zone. Continuous runs producing over 20 meters of electrolyte have been made. The ceramic properties are uniform and are constant with time as shown in the following Examples 2, 3 and 4.

EXAMPLE 2

A continuous run uphill at a temperature of 1745° C. and traverse rate of 50 mm/minute. Firing tube inclined at 4° to the horizontal. 2000 mm of ceramic were produced and equilibrium became established after firing 100 mm of ceramic. Densities were then uniform thoughout the remainder of the run. These firing conditions produce coarse grained ceramic.

| Tube No. | Posn. in run (mm) | Density (Kg/m$^3$) |
|---|---|---|
| M8/1a | 0 – 51 | 3230 |
| b | 51 – 102 | 3239 |
| c | 102 – 153 | 3250 |
| d | 153 – 205 | 3255 |
| M8/3 | 413 – 618 | 3249 |
| M8/4a | 618 – 669 | 3248 |
| b | 669 – 720 | 3244 |
| c | 720 – 771 | 3249 |
| d | 771 – 823 | 3250 |
| M8/5 | 823 – 1030 | 3244 |
| M8/8 | 1441 – 1648 | 3249 |
| M8/9 | 1648 – 1848 | 3249 |

In the case of tubes M8/1 and M8/4, the letters a, b, c and d refer to the four samples taken from the respective tubes.

EXAMPLE 3

A sample from Example 2 was used to investigate uniformity through the wall thickness of a tube. This was achieved by measuring the density, successively grinding away the outside wall and remeasuring the density. The sample was uniform right up to the outside wall. Sample M8/4b (669–720 mm)

| Mass (x 10$^3$Kg) | Density (Kg/m$^3$) |
|---|---|
| 6.642 | 3249 |
| 5.944 | 3252 |
| 5.264 | 3251 |
| 4.754 | 3253 |

EXAMPLE 4

Run M21 (tubes 21 to 39) was continuous and uphill. Four meters of electrolyte were produced. The temperature was 1720° C. with a traverse speed of 50 mm/minute and the angle between firing tube and horizontal was 4°.

The mean density for the complete run was 3225 Kg/m$^3$, with a standard deviation of 6 Kg/m$^3$. These firing conditions produce fine grained ceramics.

| Tube No. | Posn. in run (mm) | Density (Kg/m$^3$) |
|---|---|---|
| 21 | 0 – 205 | 3223 |
| 22 | 205 – 408 | 3224 |
| 23 | 408 – 618 | 3223 |
| 24 | 614 – 820 | 3214 |
| 25 | 820 – 1025 | 3222 |
| 26 | 1025 – 1231 | 3222 |
| 27 | 1231 – 1438 | 3222 |
| 28 | 1438 – 1645 | 3225 |
| 29 | 1645 – 1847 | 3239 |
| 30 | 1847 – 2053 | 3238 |
| 31 | 2053 – 2260 | 3221 |
| 32 | 2260 – 2466 | 3225 |
| 33 | 2466 – 2668 | 3228 |
| 34 | 2668 – 2875 | 3221 |
| 35 | 2875 – 3079 | 3225 |
| 36 | 3079 – 3284 | 3224 |
| 37 | 3284 – 3490 | 3223 |
| 39 | 3695 – 3901 | 3230 |

Examples 2, 3 and 4 illustrate how correct atmosphere control may be achieved by natural convection. For a given furnace geometry, the convection current depend on the angle of inclination of the firing tube and ceramic properties will also be sensitive to this angle. This is demonstrated in FIG. 2 which is a graphical diagram showing the relationship between density and angle of slope to the horizontal for an upward sloping arrangement. The firing temperature was 1720° C with a traverse speed of 50 mm/minute. The graph shows that, as the angle is varied, the density exhibits a flat topped maximum. The slope has to be sufficiently great that the convective gas flow carries the water vapour upwardly through the tube. It should not be so great however that the sodium oxide is carried away from the firing zone too fast preventing the establishment of the stable soda-rich atmosphere.

The advantage of continuous firing providing a stable atmosphere and improving ceramic properties can be seen by reference to Example 5 below. Two sets of tubes were fired under similar conditions except that one set were continuously and the other intermittently fired. A marked increase in the absolute value of the density resulted.

EXAMPLE 5

In run 29 a number of tubes were fired at 1745° C at a traverse rate of 50 mm per minute. However they were fired intermittently. Single tubes were pushed through the furnace using a long thin push rod (3.2 mm outside diameter rod or tube), and the orientation of the furnace was horizontal. The density of samples 14, 15 and 18 are recorded below:

| Sample | Density |
| --- | --- |
| 29/14 | 3195 |
| 29/15 | 3208 |
| 29/18 | 3193 |

From these examples, when relying on natural convection to zone sinter β-alumina ceramic electrolyte, the material must be moved uphill through a furnace tube inclined at an angle greater than 0° to the horizontal, but preferably between 4° and 10 °. Material sintered under these conditions is uniform both throughout the bulk and as a function of time. It will be understood that the preferred angle found in this way is related to the particular furnace and shapes being processed. The convection airflow will depend, for example, on the relative cross-sectional areas of the article and furnace tube. For any given conditions the optimum slope may readily be found empirically.

Although reference has been made more particularly to the production of tubes of β-alumina ceramic, the method and apparatus are equally applicable to the production of discs which can be passed through the furnace in succession so, in effect, forming a rod.

The densities are significantly less than those obtained in Example 2 when the speed and temperature were the same, but the samples were passed continuously uphill through a tube inclined at an angle of 4° to the horizontal.

We claim:

1. In a method of producing a beta-alumina ceramic article comprising the steps of forming a shape of compressed powder of a composition which on sintering will result in a beta-alumina ceramic, and then moving the shape continuously through a tubular furnace in the direction of the longitudinal axis thereof to thereby result in the formation of water vapor and a stable atmosphere of sodium oxide vapor and in order to sinter said powder, the improvement comprising simultaneously causing an air flow through the tubular furnace in the direction of movement of the shape at a speed not less than the speed of movement of the shape while moving said shape through said furnace, said air flow being sufficient to carry said water vapor through said furnace but not so great that said sodium oxide is carried through said furnace faster than said sodium oxide is formed.

2. A method as claimed in claim 1 wherein the air is forced to flow through the furnace.

3. A method as claimed in claim 1 wherein the air flow is a convective flow, the axis of the tubular furnace being sloped upwardly in the direction of movement of the article to induce the convective flow.

4. A method as claimed in claim 3 wherein the axis of the tubular furnace is sloped upwardly at an angle of 4° to 10° to the horizontal.

5. A method as claimed in claim 1 wherein the shape has a speed of traverse through said furnace, wherein said speed of traverse is between 25 and 115 mm per minute.

6. In a method of producing a beta-alumina ceramic article of elongate form comprising the steps of forming a shape of compressed powder of a composition which on sintering will result in a beta-alumina ceramic, and then moving the shape continuously lengthwise through a tubular furnace in the direction of the longitudinal axis thereof to thereby result in the formation of water vapor and a stable atmosphere of sodium oxide vapor and so that a short part of the length of the shape is raised to the sintering temperature with the heated zone gradually moving along the length of the material to be fired, the maximum temperature being a sintering temperature between 1550° C and 1900° C, the improvement comprising simultaneously causing an air flow through the tubular furnace in the direction of movement of the shape at a speed not less than the speed of movement of the shape while moving said shape through said furnace, said air flow being sufficient to carry said water vapor through said furnace but not so great that said sodium oxide is carried through said furnace faster than said sodium oxide is formed.

7. In a method of producing beta-alumina ceramic articles comprising the steps of forming shapes of compressed powder of a composition which on sintering will result in a beta-alumina ceramic, and then moving a set of these shapes continuously through a tubular furnace in the direction of the longitudinal axis thereof to thereby result in the formation of water vapor and a stable atmosphere of sodium oxide vapor and in order to sinter said powder, the improvement comprising simultaneously causing an air flow through the tubular furnace in the direction of movement of the shapes while moving said shapes through said furnace, said air flow being sufficient to carry said water vapor through said furnace but not so great that said sodium oxide is carried through said furnace faster than said sodium oxide is formed.

8. A method as claimed in claim 7 wherein the compressed powdered shapes are traversed at a uniform speed v through the furnace and wherein the furnace has a temperature profile increasing in temperature from one end up to a maximum sintering temperature between 1600° C and 1900° C and decreasing towards the other end, the length $l$ of the sintering zone which is within 10° C of the maximum temperature in the furnace, and the velocity v at which the tube is traversed being such that the time $l/v$ during which any point in the material is in the sintering zone is between 12 seconds and 2 minutes, the temperature profile of the furnace and the rate of traverse of the material being such that any point on the material is heated up to the sintering temperature and cooled from the sintering temperature said heating and cooling being at a rate between 200° C per minute and 2400° C per minute.

9. In a method of producing beta-alumina ceramic articles of elongate form comprising the steps of forming shapes of compressed powder of a composition which on sintering will result in a beta-alumina ceramic, and then moving a set of these shapes continuously lengthwise through a tubular furnace in the direction of the axis thereof to thereby result in the formation of water vapor and a stable atmosphere of sodium oxide vapor and so that a short part of the length of the shapes is raised to the sintering temperature with the heated zone gradually moving along the length of the shapes to be fired, the maximum temperature being a sintering temperature between 1550° C and 1900° C, the improvement comprising simultaneously causing an air flow through the tubular furnace in the direction of movement of the shapes at a speed not less than the speed of movement of the shapes while moving said shapes through said furnace, said air flow being sufficient to carry said water vapor through said furnace but not so great that said sodium oxide is carried through said furnace faster than said sodium oxide is formed.

* * * * *